United States Patent [19]

Anglin

[11] 4,355,275

[45] Oct. 19, 1982

[54] BATTERY CHARGER WITH CURRENT PULSE REGULATION

[76] Inventor: Russell E. Anglin, 6157 Cottle Rd., San Jose, Calif. 95123

[21] Appl. No.: 277,091

[22] Filed: Jun. 25, 1981

Related U.S. Application Data

[63] Continuation-in-part of Ser. No. 85,279, Oct. 15, 1979, abandoned.

[51] Int. Cl.³ .............................................. H02J 7/00
[52] U.S. Cl. ....................................... 320/21; 307/38; 307/48; 320/40; 320/48; 320/54
[58] Field of Search ................... 320/2, 4, 19, 21, 22, 320/40, 47, 48, 54; 307/19, 20, 38, 48

[56] References Cited

U.S. PATENT DOCUMENTS

| | | | |
|---|---|---|---|
| 691,144 | 1/1902 | Hutchinson | 320/48 |
| 1,786,280 | 12/1930 | Woodbridge | 320/22 |
| 2,392,737 | 1/1946 | Hever | 320/5 |
| 3,281,816 | 10/1966 | Raymond | 320/25 |
| 3,466,453 | 9/1969 | Greenberg | 320/25 |
| 3,654,538 | 4/1972 | Gardberg | 320/25 |
| 3,746,961 | 7/1973 | Dobie | 320/2 |
| 3,857,082 | 12/1974 | Van Opijnen | 320/25 |
| 3,900,783 | 8/1975 | Herzog et al. | 320/25 |
| 4,004,208 | 1/1977 | Tamminen | 320/2 |
| 4,019,096 | 4/1977 | Bullinga | 361/75 |
| 4,068,277 | 1/1978 | Simokat | 361/75 |
| 4,109,193 | 8/1978 | Schultheis | 320/2 |
| 4,166,241 | 8/1979 | Grant | 320/25 |
| 4,215,306 | 7/1980 | Mace | 320/2 |
| 4,217,534 | 8/1980 | Cole | 320/25 |
| 4,258,305 | 3/1981 | Anglin | 320/2 |

Primary Examiner—William H. Beha, Jr.
Attorney, Agent, or Firm—Paul L. Hickman

[57] ABSTRACT

A battery charger device characterized by a pair of cigarette lighter plugs having their negative contacts coupled together by a conductor and having their positive contacts coupled together by a self-resetting circuit breaker. In use, one of the plugs is inserted into the cigarette lighter socket of a car having a discharged battery and the other plug is inserted into the cigarette lighter socket of another car having a good battery. If the discharged battery starts to draw current that is greater than a predetermined level the current flow is regulated by a rapid cycling on and off of the circuit breaker. When the current drawn by the discharged battery is less than the predetermined level the circuit breaker conducts current between the two batteries with only insignificant IR loss.

11 Claims, 5 Drawing Figures

BATTERY CHARGER WITH CURRENT PULSE REGULATION

CROSS-REFERENCES TO RELATED APPLICATIONS

This application is a continuation-in-part of co-pending application Ser. No. 085,279 filed October 15, 1979 by inventor RUSSELL E. ANGLIN, and entitled MULTI-PURPOSE BATTERY CHARGER DEVICE, now abandoned.

BACKGROUND OF THE INVENTION

1. Field of the Invention

This invention relates generally to battery chargers, and more particularly to automobile battery chargers.

2. Description of the Prior Art

When a car's battery becomes discharged a common remedy is to jumpstart the car and then allow the car's own charging system to recharge the battery. A problem with jumpstarting is that it is a messy and sometimes dangerous operation.

Another alternative is to directly recharge the car's battery with a battery charger connected to a conventional AC power source. This alternative is not practical for most road side or emergency applications.

In U.S. Pat. No. 4,258,305 Russell E. Anglin describes an emergency battery charger which charges a car's discharged battery through its cigarette lighter socket. While Anglin's is a practical and economical, it is not as efficient or as fast charging as it might be since all of the charging current must pass through a current limiting lamp.

SUMMARY OF THE INVENTION

It is an object of this invention to provide a battery charger that is compact, lightweight and that can be easily and unobtrusively stored within a small space, such as the glove compartment of a car.

It is a further object of this invention to provide a battery charger that charges a car's battery by connection through the car's cigarette lighter socket in the most rapid manner possible.

Briefly, the invention includes a first plug engagable with the cigarette lighter socket of a car having a discharged battery, a second plug engagable with the cigarette lighter socket of another car, a conductor connecting the grounded terminal of the two plugs together, and a self-resetting circuit breaker coupling the positive contacts of the two plugs together. When the plugs are inserted into the cigarette lighter sockets of the two cars a current will flow from the charged battery to the discharged battery. When the current exceeds a predetermined level the circuit breaker will turn itself off and then on again, producing a pulsating current waveform which transfers current to the discharged battery as rapidly as possible without blowing the cigarette lighter fuse.

In a more deluxe embodiment of this invention a flasher, switch, and an incandescent light bulb are included so that the device can variously serve as an emergency flasher and a spotlight. A meter, calibrated in minutes, is also included to indicate how many minutes of charge time would be required to recharge the discharged battery.

An advantage of this invention is that it is compact and lightweight and can replce bulky jumper cables.

Another advantage of this invention is that a car's battery can be conveniently recharged through its cigarette lighter, thus avoiding most of the hazards of jumpstarting.

A major advantage of this invention is that a car's battery can be recharged through its cigarette lighter in the most rapid manner possible due to the current pulsing capabilities of the device. When current is flowing through the circuit breaker there is virtually no power loss in the circuit, and the charging current is limited only by the internal resistances of the batteries and of the connecting conductors.

These and other objects and advantages of the present invention will no doubt become apparent upon a reading of the following descriptions and a study of the several figures of the drawing.

DETAILED DESCRIPTION OF THE PREFERRED EMBODIMENT(S)

Figure 1:
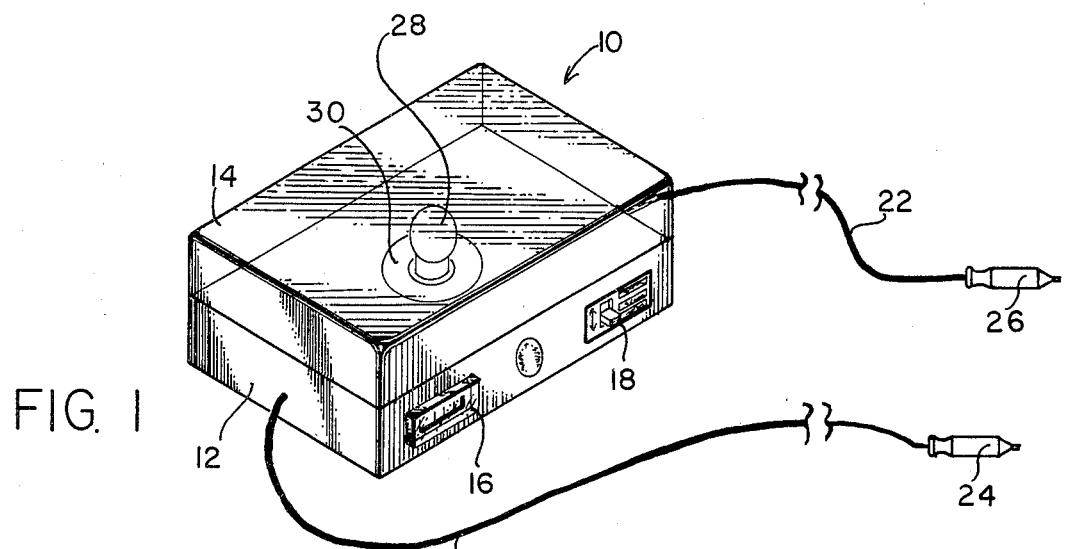
FIG. 1 is a perspective view of a battery charger device in accordance with the present invention.

Referring to the perspective view of FIG. 1, a device in accordance with the present invention is shown to include a chassis 10 including an opaque lower portion 12 and a transparent upper portion 14. Mounted on the forward face of lower portion 12 is a meter 16 and a selector switch 18. Extending from the sides of the lower portion are a pair of conductor leads 20 and 22 which couple a pair of cigarette lighter plugs 24 and 26 to circuitry housed with portion 12. Upper portion 14 forms a cover for the chassis into which light bulb 28 extends. Attached to the upper surface of portion 12 and surrounding a base portion of the light bulb is a reflector 30.

Figure 2:
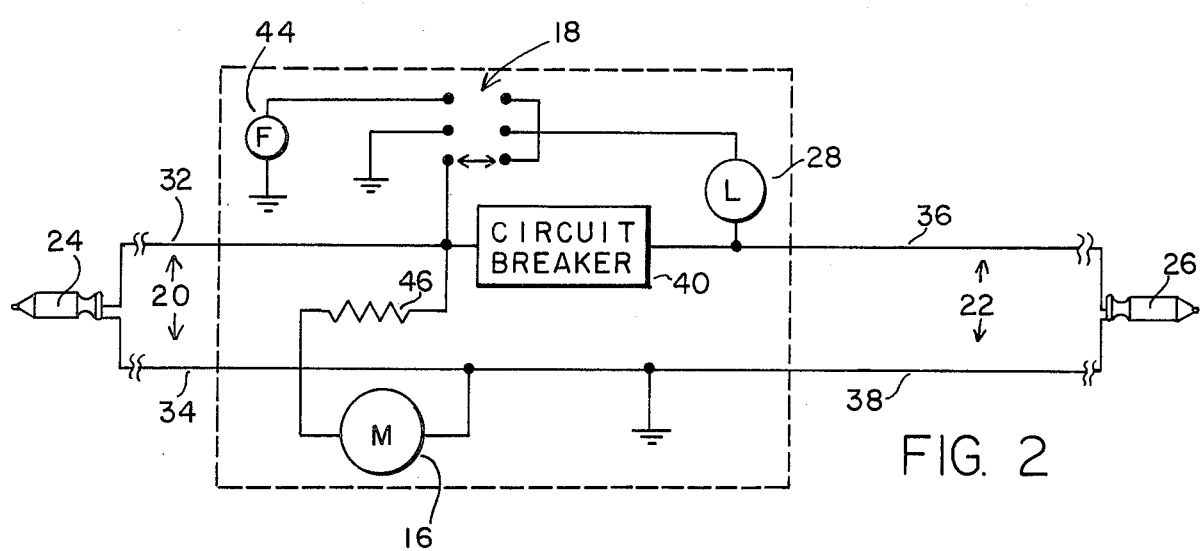
FIG. 2 is a schematic diagram of the device.

Referring now to the schematic of FIG. 2, the circuit elements of this device that are housed within portion 12 are shown. As can be seen, leads 20 and 22 comprise individual wires 32, 34, and 36, 38, respectively. Wires 34 and 38 are coupled together and provide a ground for the circuit. Wires 32 and 36 are coupled together by a circuit breaker 40, which for most purposes is rated at 7.5 amperes. The circuit breaker is of the self-resetting type.

Switch 18 is shown to be a three position side DP3T switch, and is used to select the device's function. When the switch is in the lower position, as shown, lamp 28 is coupled across the terminals of the circuit breaker and the device is ready to charge a battery. When the switch is in the center position the bulb is coupled to ground and the device can be used as a spotlight. When the switch is in its upper position the light is coupled to ground through a flasher 44 and the device can be used as an emergency flasher unit. Lamp 28 is preferably a 12 volt, two ampere, incandescent type bulb.

Meter 16 is coupled between wires 32 and 34 by a resistor 46. If the meter has a 1 mA range resistor 46 should preferably be a ¼ watt, 5% carbon resistor of approximately 10K ohms. This would allow for an approximately 12 volt range on the meter.

Figure 3:
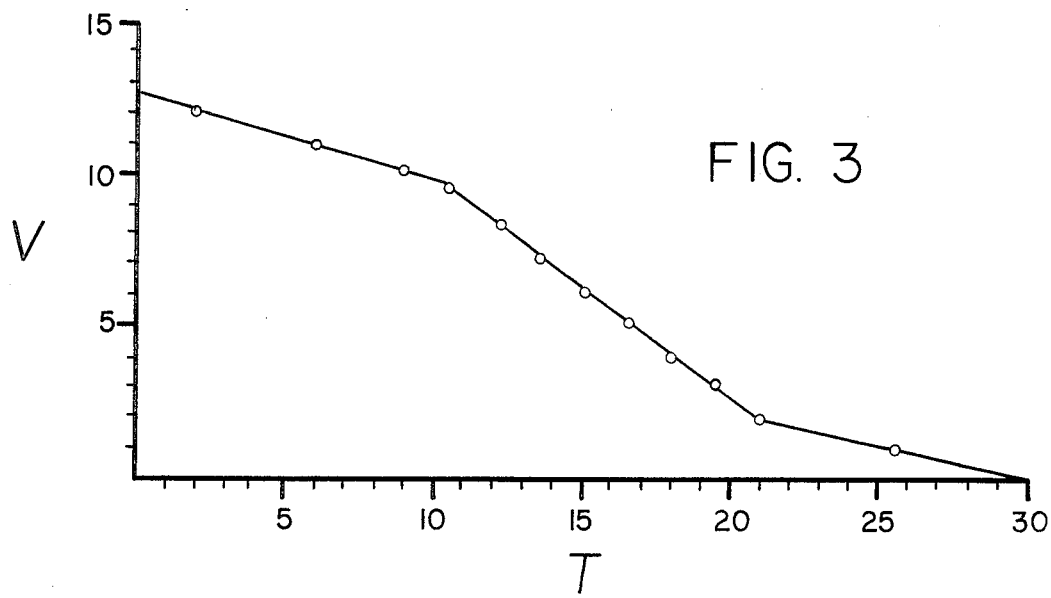
FIG. 3 is a graph functionally relating the charge time in minutes to the initial voltage of the discharged battery.

Referring now to FIG. 3, it may be seen that there is a functional relationship between the voltage "V" on the discharged battery and the time "T" that it takes for the discharged battery to become recharged. For example, if the discharged battery has zero volts between its terminals it will take thirty minutes to recharge, while if it has 5 volts between its terminals it will take about 16½ minutes to recharge. Thus the face of meter 16 can be calibrated in minutes to recharge.

When plug 24 is inserted into the cigarette lighter socket of a car having a discharged battery and plug 26 is inserted into the cigarette lighter socket of a car having a charged battery a current will flow from the good battery to the discharged battery through circuit breaker 40. If the current flowing is less than 7.5 amperes the circuit breaker will not open and lamp 28 will not illuminate since it will have a zero potential between its leads. If, however, the current does exceed 7.5 amperes, as it probably will when the discharged battery is just starting to be charged, circuit breaker 40 will open and lamp 28 will illuminate. The current flowing through the bulb will start to recharge the discharged battery. In the mean time, circuit breaker 40 will reset itself and current will once again flow between the batteries without an IR drop. If the current still exceeds 7.5 amperes the circuit breaker will again open and the aforementioned cycle will be repeated. Thus, when the current through the device would tend to exceed 7.5 amperes, the actual current would fluctuate between the trip current for the circuit breaker and the amount of current that is passed by the lamp.

The actual current passed by the circuit breaker may be somewhat greater than 7.5 amperes for which the circuit breaker is rated. Such an eventuality was planned for in the design of this device, as the 15 ampere fuse of the car's cigarette lighter socket circuit can actually pass 30.0 amperes for a 10 second period. Since the leads 20 and 22 are 18 feet in length and are preferably made from 16 gauge wire they possess enough inherent resistance to prevent more than 30 amperes from flowing and the circuit breaker will open long before 10 seconds have elapsed.

To use the device as a charger the switch 18 is first placed in the lower position and then plug 24 is plugged into the cigarette lighter socket of the car with a discharged battery. The headlights are then turned on to provide a load for the battery and meter 16 is read to determine the recharge time. The headlights and all other accessories are then turned off. Plug 26 is plugged into the cigarette lighter socket of the car with a charged battery and light 28 is viewed. If the lamp is flickering, nothing is done until the flickering stops. When the lamp is not flickering the engine of the car with the good battery is started and left on until the discharged battery is recharged.

To use the device as a spotlight the selector switch is placed in the central position and plug 26 is inserted into the cigarette lighter socket. To use the device as a flashing unit the selector switch 18 is placed in its upper position and plug 26 is inserted into a cigarette lighter socket.

Figure 4:
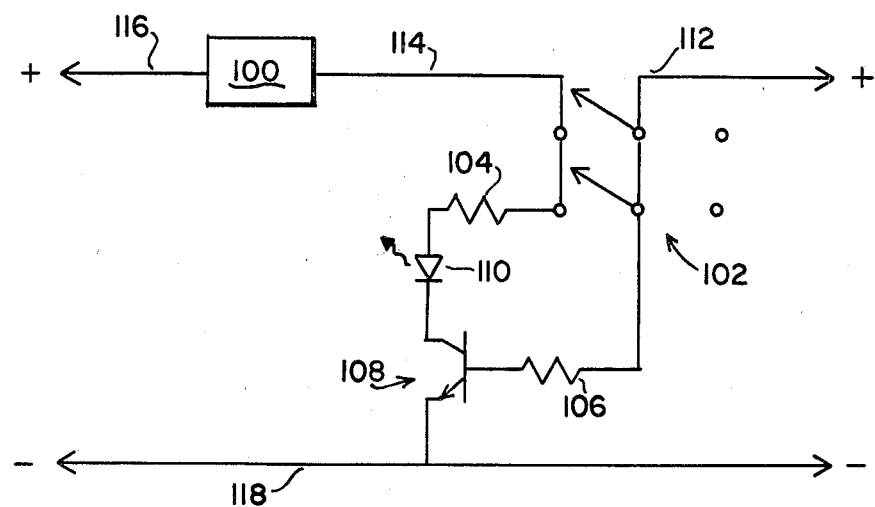
FIG. 4 is a schematic diagram of a second preferred embodiment of the present invention.

Referring now to FIG. 4, a second preferred embodiment of the present invention includes a self-resetting circuit breaker 100, a D.P.D.T. switch 102, a pair of resistors 104 and 106, an NPN transistor 108, and an LED 110. The terminals of switch 102 are wired so that the switch functions as a high current SPST switch between lines 112 and 114.

Circuit breaker 100 is the same type of self-resetting, two terminal circuit breaker discussed previously and is connected to line 114 and a line 116. Transistor 108 has its emitter coupled to a ground wire 118, its base to line 112 by biasing resistor 106, and its collector to line 114 by the series connection of current limiting resistor 104 and LED 110.

To charge a battery with this second embodiment the switch 102 is opened so that the circuit is in its "test" mode. Lines 112 and 118 are coupled to the discharged battery through the cigarette lighter socket of that car, and lines 116 and 118 are coupled to the good battery through the cigarette lighter socket of the other car. If the connections to the cigarette lighter sockets are adequate, bias current will flow through resistor 106 from the discharged battery to forward bias transistor 108, and current will flow through circuit breaker 100, resistor 104, LED 110 and transistor 108 to turn the LED on. If the LED does not illuminate the cigarette lighter connections are not adequate to allow the discharged battery to charge.

Once the cigarette lighter connections are verified to be adequate the switch 102 is closed so that lines 112 and 114 are coupled together. Current flows from the good battery to the discharged battery through circuit breaker 100 unless and until the current through the circuit breaker exceeds the predetermined maximum, at which time the circuit breaker cycles off and on as previously discussed.

Figure 5:
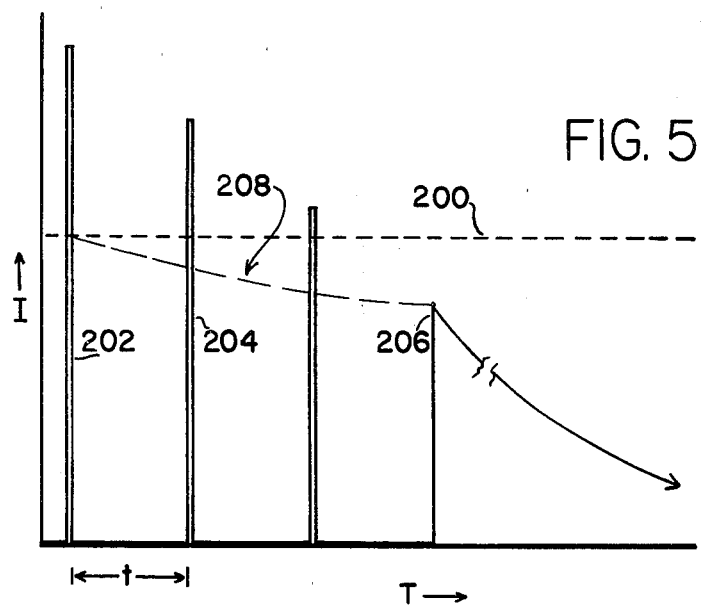
FIG. 5 is a graph illustrating the operation of the circuits of FIGS. 2 and 4.

In FIG. 5 a diagram of the performance of the two embodiments is shown. The abscissa on the diagram is the charge time and the ordinate on the diagram is the charge current. Broken line 200 indicates the predetermined maximum current (trip current) for the self-resetting circuit breaker. Referring first to the operation of the embodiment shown in FIG. 4, when the switch 102 is first closed a surge of current 202 flows from the good battery to the discharged battery that actually exceeds the maximum current level 200 for a short period of time. The circuit breaker 100 then trips and the current drops to substantially zero for the time 't' that the circuit breaker takes to reset itself. A smaller current pluse 204 then flows into the discharged battery and the cycle is repeated until the current drawn by the discharged battery falls below the maximum current level of the circuit breaker. This condition is indicated at 206. From that point in time onward the circuit breaker 100 will not trip and the charging current will exponentially decay. The current pulse regulation charges the battery in the shortest time possible since there is no IR drop in the curcuit during charge times.

The operation of the circuit of the first embodiment is different from that of the second embodiment due to the inclusion of the bypass lamp 28. As indicated by the broken line at 208 in FIG. 5, the discharged battery will continue to draw current through the lamp 28 when the circuit breaker 40 is open. As indicated at 206, when the circuit breaker closes for good the rate of charge increases because the IR drop through the lamp is eliminated.

While this invention has been described in terms of a few preferred embodiments, it is contemplated that persons reading the preceding descriptions and studying the drawing will realize various alterations, permutations and modifications thereof. For example, a solid state circuit could replace the mechanical relay of the present device as long as it operates in substantially the same manner. It is therefore intended that the following appended claims be interpreted as including all such alterations, permutations and modifications as fall within the true spirit and scope of the present invention.

What is claimed is:

1. A battery charger device with current pulse regulation comprising first plug means engagable with the cigarette lighter socket of a first vehicle, said first plug means having a first negative contact and a first positive contact, second plug means engagable with the cigarette lighter socket of a second vehicle, said second plug means having a second negative contact and a second positive contact, said first negative contact and said second negative contact defining a negative contact pair, and said first positive contact and said second positive contact defining a positive contact pair, means coupling one of said negative contact pair and said positive contact pair together to create a first coupled pair, and a self resetting, two terminal circuit breaker means coupling the other one of said negative contact pair and said positive contact pair together to create a second coupled pair, said circuit breaker means opening when the current through it exceeds a predetermined level and automatically closing thereafter.

2. A battery charger device as recited in claim 1 further comprising a light emitting device including a first lead, and a second lead, first means coupling said first lead to a first terminal of said circuit breaker means, and second means coupling said second lead to a second terminal of said circuit breaker means.

3. A battery charger device as recited in claim 2 wherein said light emitting device includes an incandescent light bulb.

4. A battery charger device as recited in claim 3 wherein said first means includes a multi-position switch which couples said first lead to said first terminal when in a first position and which uncouples said first lead from said first terminal when not in said first position.

5. A battery charger device as recited in claim 4 further comprising a two terminal flasher means having one terminal coupled to said first coupled pair and its other terminal coupled to a second position of said multi-position switch to be selectively coupled to said first lead of said light bulb.

6. A battery charger device as recited in claim 5 wherein said multi-position switch means includes a third position whereby said first lead may be selectively coupled to said first coupled pair.

7. A battery charger device as recited in claim 6 further comprising a chassis means including a substantially opaque bottom portion and a transparent upper portion, said light bulb being coupled through said base portion to extend into said upper portion.

8. A battery charger device as recited in claim 7 further comprising a disk shaped reflector means provided with a centrally located aperture, said reflector means being provided with a centrally located aperture, said reflector means being attached to an upper surface of said bottom portion so as to surround a base portion of said light bulb.

9. A battery charger device as recited in claim 8 further comprising time calibrated meter means coupled between said first coupled pair and said second coupled pair.

10. A battery charger device as recited in claim 1 further comprising a switch means coupled in series with said self-resetting circuit breaker means.

11. A battery charger device as recited in claim 10 further comprising indicator means coupled across said switch means and operative to indicate adequate connection between the electrical systems of said first vehicle and said second vehicle.

* * * * *